UNITED STATES PATENT OFFICE.

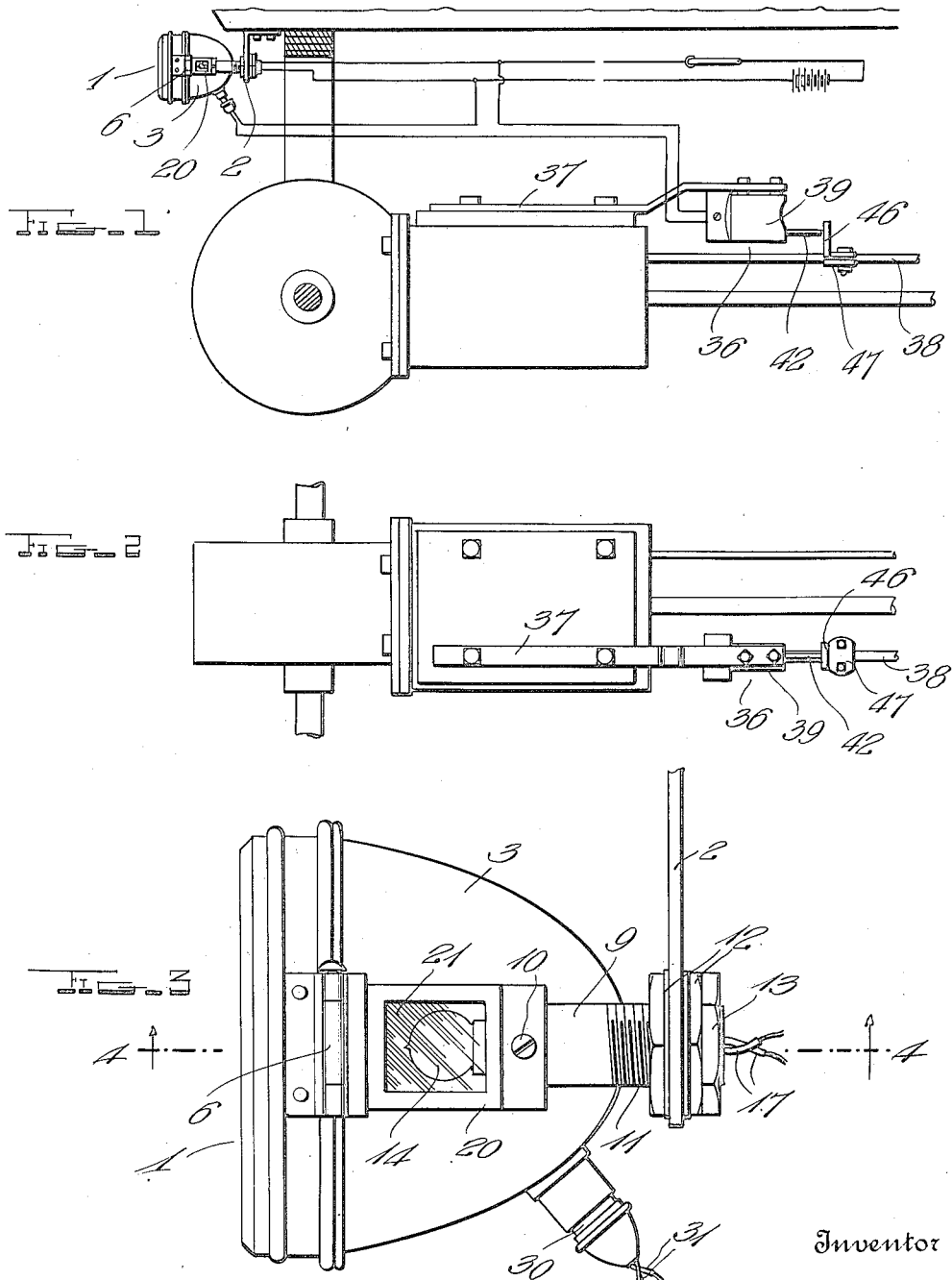

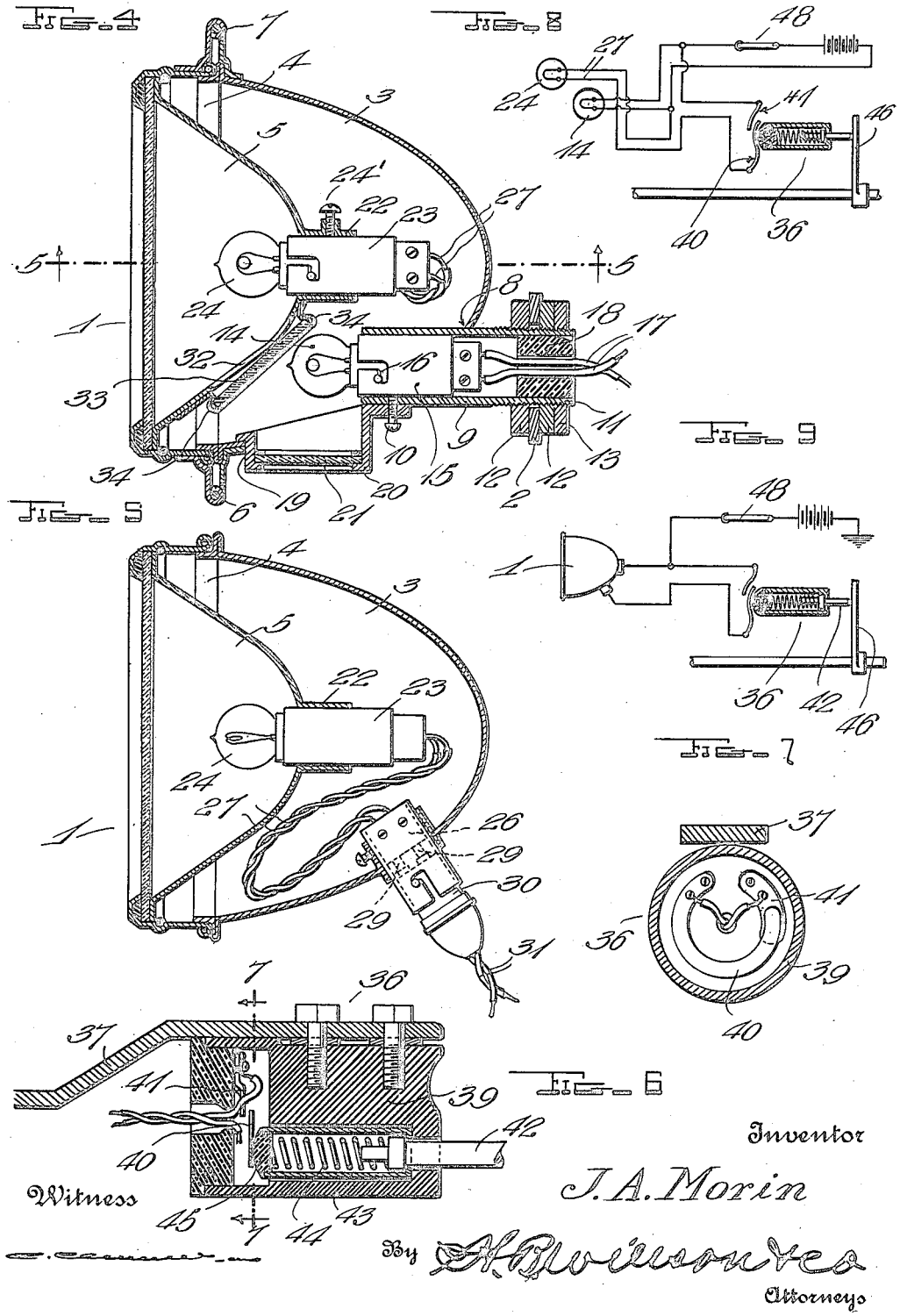

JOSEPH A. MORIN, OF SPRINGFIELD, VERMONT.

AUTOMOBILE TAIL-LIGHT.

1,225,472.   Specification of Letters Patent.   Patented May 8, 1917.

Application filed July 20, 1916. Serial No. 110,340.

*To all whom it may concern:*

Be it known that I, JOSEPH A. MORIN, a citizen of the United States, residing at Springfield, in the county of Windsor and State of Vermont, have invented certain new and useful Improvements in Automobile Tail-Lights; and I do declare the following to be a full, clear, and exact description of the invention, such as will enable others skilled in the art to which it appertains to make and use the same.

This invention relates to signal devices which are particularly adapted to be attached to the rear ends of motor vehicles.

The primary object of this invention is to provide a combined searchlight and tail light for the rear end of an automobile, the tail light being normally supplied with energy, while the searchlight is only operated when the vehicle is reversed.

Another object of this invention is to provide a combined automobile searchlight and tail light on the rear end of a motor vehicle, which is provided with means for automatically supplying the searchlight with energy upon the reversal of the vehicle.

Another object of this invention is to provide a device of this character which is simple and durable in construction, inexpensive to manufacture, and one which will be very efficient in operation.

With these and numerous other objects in view, the invention consists of the novel features of construction, combination and arrangement of parts which will be herein referred to and more particularly pointed out in the specification and claims.

In the accompanying drawings:

Figure 1 is a side elevation showing my improved automobile tail light in applied position;

Fig. 2 is a top plan view showing the positioning of the switch 36 with respect to the reverse rod;

Fig. 3 is a side elevation of the light proper;

Fig. 4 is a horizontal section taken on the line 4—4 of Fig. 3;

Fig. 5 is a vertical section taken on the line 5—5 of Fig. 4;

Fig. 6 is a central vertical longitudinal section of the switch 36;

Fig. 7 is a vertical transverse section taken on the line 7—7 of Fig. 6; and

Figs. 8 and 9 are diagrammatic views illustrating different wiring for connecting the lamps 24 and 14 with the battery.

In describing my invention I shall refer to the drawings in which similar reference characters designate corresponding parts throughout the several views, and in which the numeral 1 designates my improved combined tail light and searchlight which is adapted to be secured to a bracket 2 which is fastened to the rear end of a motor vehicle in a manner to be hereinafter more fully described. This light comprises a substantially cup-shaped casing 3 which is provided with an open face 4 in which is positioned a reflector 5 which is hinged to the edge of the same as shown at 6, and when positioned thereover will entirely cover the said open face. This reflector 5 is secured in position by a locking means 7 which is positioned at a point diametrically opposite the hinge 4. The casing 1 is considerably deeper than the depth of the reflector 5 and a space will be left between the walls of these parts as clearly shown in Fig. 4 of the drawings.

The casing 1 is provided with an opening 8 adjacent its rear end in which is secured a sleeve 9 by means of a set screw 10. This sleeve 9 has its rear projecting end 11 externally threaded, and is adapted to have positioned thereon locking members 12, which are secured in locked position by a nut 13. These locking members 12 are positioned on either side of the bracket 2, and when secured in locked relation by means of the lock nut 13, the light will be securely held adjacent the rear of the vehicle.

Disposed within the casing 1 is a small electric lamp 14, which has its plug 15 detachably locked into engagement with the sleeve 9 as shown at 16. This plug 15 is provided adjacent its inner end with means whereby wires 17 which connect the lamp with the source of current may be operatively connected therewith. These wires 17 extend outwardly through an insulating bushing 18 positioned in the inner end of the sleeve 9.

The casing 1 is further provided with an opening 19 adjacent the rim of the same, at one side thereof when the light is in position, and this opening 19 is provided with an angularly projecting hood 20 which has secured in its open outer end a transparent glass slide 21. The hood 20 is disposed adjacent one side of the lamp 14, so that when the same is supplied with energy the light rays will be directed through the transparent slide 21 and out through the side of the casing. The tail light is so arranged that the hood will be positioned directly to one side of the license sign which is secured to the rear end of the vehicle, so that when the lamp 14 is operated, the light therefrom will be reflected outwardly and illuminate the sign as is required by law.

Centrally positioned within the reflector 5 is a sleeve 22 through which is adapted to be mounted a plug 23 of an electric lamp 24 which is secured at its outer end and is positioned centrally within the reflector 5. This plug 23 is secured in position by means of a set screw 24' and extends through the sleeve and locks the same in position. The inner end of the plug 23 is connected with another plug 26 which extends through one side of the casing 1, by wires 27. These wires 27 are considerably longer than the distance between the inner end of the plug 23 and the plug 26 when the reflector is positioned over the open end of the casing, so that when the reflector 5 is swung outwardly, the movement of the same will not be in any way limited. There will be ample space between the inner wall of the reflector and the casing so that the wires 27 may be easily placed therein when the reflector is in position. The plug 26 has in its outer end a pair of contact points 29 which are adapted to receive an additional plug 30 which is connected with the wires 31 leading to a source of current for the lamp 24.

The reflector 5 has an opening 32 therethrough adjacent the central lamp 24, and this opening 32 has a colored screen 33 positioned across the same and secured in grooved strips 34 which are fastened to the inner surface of said reflector as clearly shown in Fig. 4 of the drawings. This colored screen 33 will be positioned directly in front of the electric lamp 14 and when the said lamp is operated, it will form the tail light for the vehicle.

The electric lamp 14 is connected with circuit controlled means and is normally operated, and the light reflected through the colored screen 33 will form the tail light for the vehicle that is necessary. The lamp 14 will furthermore direct light rays through the transparent slide 21 and illuminate the license sign which is secured adjacent thereto. The lamp 24 which is positioned within the reflector 5 is normally inoperative, but by means to be hereinafter more fully described, when the vehicle is reversed, this lamp is supplied with energy and a rear searchlight is therefore provided to illuminate the road.

In Figs. 1, 2 and 6 of the drawings I have shown diagrammatic views showing the circuit control means for energizing the lamps within the tail light 1, and the numeral 36 designates the switch which completes the circuit through the lamp 24 to illuminate the searchlight. This switch 36 is secured to a supporting bracket 37, preferably positioned on the transmission case of the vehicle, in such a manner that it will be disposed parallel with respect to the reverse rod 38 of the vehicle.

The switch 36 comprises a casing 39, having two contact points 40 and 41 which are normally disposed out of contact in one end, and the same is provided with a spring pressed plunger 42 projecting from the opposite end of the casing and having its inner end disposed within a sleeve 43 and pushing against a coiled spring 44 which has a plug 45 at its inner end adapted to push one of the contact points into engagement with the other. This coiled spring 44 normally holds the plunger 42 extended, and the plug 45 is held out of operative engagement with one of the contact points 41 by the other point 40 comprising a spring member. Upon forcing the plunger 42 inwardly, the coil will move the plug 45 against the pressure of the spring contact point 40 and this point will contact with the adjacent contact point 41 thereby completing the circuit.

This switch 36 is positioned parallel with the reverse rod of the vehicle, and secured to said rod is a laterally projecting arm 46, that is held in operative position with respect to the same by a bracket 47 as clearly shown in Figs. 1 and 2 of the drawings. In normal position this arm 46 is positioned adjacent the outer end of the plunger 42 of the switch. This plunger 42 is directly in the path of movement of the arm 46 when the same is moved by movement of the reverse rod 38. Upon operation of the reverse mechanism of the vehicle, the arm 46 will be drawn toward the switch by movement of the rod 38, and this arm will force the plunger inwardly, thereby operating the switch, and completing a circuit to supply energy to the searchlight.

Figs. 8 and 9 illustrate diagrammatic views of single and double wire circuits by which the lamps 24 and 14 are supplied with energy to light the same. These circuits are provided with a switch 48 which is the primary operating means, and which is disposed in position whereby it may be easily operated by the driver of the vehicle. When this switch is operated, the lamp 14 will be supplied with energy and consequently the tail light will be in operation. Upon operation of the reverse mechanism as has been hereinbefore fully explained, the switch 36 will be operated and the lamp 24 supplied with energy to charge the search light for illuminating the road at the rear of the vehicle when the vehicle is driven backward.

The combined searchlight and tail light form a very simple and compact device which may be easily secured to the rear of an ordinary vehicle in various positions.

When the switch 48 is closed, the tail light will be supplied with energy, and also the license number will be fully illuminated. As soon as the vehicle is reversed movement of the reverse rod 38 will carry the arm 46 into engagement with the spring pressed plunger 42 of the switch 46. This switch will be operated whereby the searchlight will be supplied with energy. As soon as the mechanism is released, the rod 38 will move the arm 36 out of contact with the plunger and the coiled spring will return the plunger to its original position whereby contact in the switch will be broken and the circuit that supplies the energy to the searchlight also broken. This automatic means will only operate the searchlight when the reverse is operated in the vehicle, and as soon as the vehicle is driven forward, and the reverse released, the searchlight will be cut off.

This device affords a simple and efficient safety automobile tail light and searchlight and one which will be very efficient in operation.

From the foregoing description of the construction and operation of my improved device, the manner of applying the same to use, and the operation thereof will be readily understood, and it will be seen that I have provided a simple and efficient device of this character for carrying out the objects of the invention.

This device may be applied to various types of motor vehicles and the various details of construction incidental to the automatic operation of the searchlight may be slightly modified to conform to the different positioning of the reverse rods, etc., in the different types of vehicles.

I claim:

1. A tail light comprising a casing, a rearwardly facing reflector positioned in the rear end of said casing, a lamp in said reflector, a second lamp in the casing between the front end thereof and the reflector, said reflector having an opening with a colored screen across the same disposed to receive the rays from said second lamp and said casing having between its ends an opening adjacent said second lamp for illuminating a license tag.

2. A tail light comprising a cup-shaped casing having an opening adjacent its edge, an angularly disposed hood for said opening having a transparent outer end, a lamp in said casing adjacent said opening to direct its rays therethrough to illuminate a license tag, a reflector hinged to the edge of the casing and adapted to close the open rear end of the same when in position, a second lamp located in said reflector, said reflector having an opening therein disposed for receiving the rays of the first named lamp, and a colored screen across said opening and carried by the reflector.

3. A tail light comprising a cup-shaped casing, a reflector hinged to the edge of said casing and adapted to cover the open rear end of the same when in position, a centrally disposed socket member in said reflector, a lamp positioned in said socket member, said reflector having an opening adjacent one side of said lamp, a colored screen extending across said opening, a second socket member in the casing in substantial alinement with the opening in the reflector, and a lamp in said last named socket member.

In testimony whereof I have hereunto set my hand in the presence of two subscribing witnesses.

JOSEPH A. MORIN.

Witnesses:
 Fred C. Davis,
 Charles E. Sawyer.